US005523960A

United States Patent [19]

Jeong

[11] Patent Number: 5,523,960

[45] Date of Patent: Jun. 4, 1996

[54] EVALUATION METHOD OF ASSEMBLY SEQUENCES

[75] Inventor: Bong-ju Jeong, Anyang, Rep. of Korea

[73] Assignee: Samsung Electronics Co., Ltd., Suwon, Rep. of Korea

[21] Appl. No.: 288,058

[22] Filed: Aug. 10, 1994

[51] Int. Cl.[6] .................................................... G05B 13/04

[52] U.S. Cl. .......................... 364/578; 364/468; 364/402

[58] Field of Search .................................... 364/578, 468, 364/402, 156

[56] References Cited

U.S. PATENT DOCUMENTS

| | | | |
|---|---|---|---|
| 4,615,011 | 9/1986 | Linsker | 364/491 |
| 4,648,023 | 3/1987 | Powell | 364/156 |
| 4,931,944 | 6/1990 | Richter et al. | 364/468 |
| 5,040,123 | 8/1991 | Barber et al. | 364/468 |
| 5,047,947 | 9/1991 | Stump | 364/468 |
| 5,093,794 | 3/1992 | Howie et al. | 364/468 |
| 5,155,677 | 10/1992 | Kurtzberg et al. | 364/156 |
| 5,155,679 | 10/1992 | Jain et al. | 364/402 |
| 5,177,688 | 1/1993 | Rentschler et al. | 364/468 |
| 5,216,593 | 6/1993 | Dietrich et al. | 364/402 |
| 5,231,567 | 6/1993 | Matoba et al. | 364/401 |
| 5,233,533 | 8/1993 | Edstrom et al. | 364/408 |
| 5,255,181 | 10/1993 | Chapman et al. | 364/401 |
| 5,258,915 | 11/1993 | Billington et al. | 364/468 |
| 5,280,425 | 1/1994 | Hogge | 364/402 |
| 5,315,521 | 5/1994 | Hanson et al. | 364/468 |
| 5,321,620 | 6/1994 | Tanaka et al. | 364/468 |

OTHER PUBLICATIONS

Vincze, "Expert Choice", Decision Line, Mar. 1990, pp. 10–12.
Saaty et al., "Operations Management", 1990.
Nahmias, "Production & Operations Analysis", 1989.
Vajda, "Readings in Linear Programming", 1958.
De Floriani et al., "A Graph Model for Face–To–Face Assembly", Aug. 1989.
de Mello et al., "A Correct and Complete Algorithm for the Generation of Mechanical Assembly Sequences", Aug. 1989.
de Mello et al., "Two Criteria for the Selection of Assembly Plans: Maximizing the Flexibiltiy of Sequencing the Assembly Tasks & Minimizing the Assembly Time through Parallel Execution of Assembly Tasks", Oct. 1991.
de Mello et al., "And/Or Graph Representation of Assembly Plans", Apr. 1990.
Waarts et al., "A Semi–Automatic Assembly Sequence Planner", Apr. 1992.
Chen, "Neural Computation for Planning And/Or Precedence–Constraint Robot Assembly Sequences", Jan. 1990.
Sanderson et al., "Task Planning for Robotic Manipulation in Space Applications", Sep. 1988.
Sanderson et al., "Generation of Precedence Relations for Mechanical Assembly Sequences", Jan. 1989.
de Mello et al., "Assembly Planning for Large Truss Structures in Space", Jan. 1990.
Huang, "Development of an Assembly Planner Using Decomposition Approach", Jan. 1993.

*Primary Examiner*—Ellis B. Ramirez
*Assistant Examiner*—Patrick J. Assouad
*Attorney, Agent, or Firm*—Cushman Darby & Cushman

[57] ABSTRACT

An evaluation method of assembly sequences includes the steps of designing an assembly composed of a plurality of parts; preparing a component relation diagram indicating the joint relation between the plurality of parts; reducing assembly sequences containing infeasible subassemblies by computing weights of all the subassemblies in the respective processes of an AND/OR tree structure of the assembly; evaluating feasible assembly sequences obtained from the CRD by the evaluation function $$E(q)=W_h \cdot f(H(q))+W_j \cdot f(J(q))+W_i \cdot f(T(q))$$

where q is an assembly sequence, E(q) is an evaluation function, $W_h$, $W_j$ and $W_i$ are weighting factors for ease of part handling, ease of part joining, and tool changes criteria, respectively, f is a scaling function, H(q) is the sum of the weights of all subassemblies for the assembly sequence q, J(q) is number of joining direction changes for the assembly sequence q, T(q) is the number of tool changes for the assembly sequence q; and performing assembly in the assembly sequences depending on the evaluation result.

10 Claims, 7 Drawing Sheets

START
DESIGN ASSEMBLY PRODUCT
100
200
SET PARAMETER FOR ASSEMBLY RELATION BETWEEN COMPONENTS
210
DRAW CRD
220
300
PRODUCE ALL POSSIBLE ASSEMBLY SEQUENCES
310
REDUCE ASSEMBLY SEQUENCES
320
SELECT EFFICIENT ASSEMBLY SEQUENCES
330
COMPUTE EVALUATION FUNCTION
410
SELECT ASSEMBLY SEQUENCE
420
PERFORM ASSEMBLY BY SELECTED ASSEMBLY SEQUENCE
430
400
END

EVALUATION METHOD OF ASSEMBLY SEQUENCES

BACKGROUND OF THE INVENTION

The present invention relates to an evaluation method of assembly sequences, and more particularly, to an evaluation method of assembly sequences by which an assembly process is reduced to the utmost in order to be performed efficiently.

The assembly process is a production process generally performed in the latter stages of production. Also, unlike other production processes which have been highly automated, the assembly process still requires many manual operations which cannot be easily automated. Accordingly, much research into the generation, evaluation and selection of assembly sequences aiming to facilitate the assembly process is being conducted worldwide, in order to reduce manpower costs.

This research, however, has been limited to two major fields. These are (1) a technology with regard to a generation method of assembly sequences for obtaining feasible assembly sequences, by taking the geometrical properties of the respective components to be assembled and systematically generating therefrom all possible assembly sequences; and (2) a technology with regard to an evaluation method for determining the efficiency of the ultimately obtainable assembly process during the product design stage, so that a design can be changed prior to reaching the production stage.

Therefore, since the above-described conventional technologies do not take into consideration the assembly process design itself, it is impossible to determine the most efficient assembly sequence at the time of designing a product.

SUMMARY OF THE INVENTION

It is an object of the present invention to provide an evaluation method of assembly sequences which evaluates and selects the most efficient assembly sequence in the process planning step, for manufacturing a product after the product design is completed.

To accomplish the above object, the evaluation method of assembly sequences according to the present invention comprises the steps of: designing an assembly product composed of a plurality of parts; preparing a component relation diagram (CRD) indicating the joint relation between the plurality of parts; reducing assembly sequences containing infeasible subassemblies by computing weights of all the subassemblies in the respective processes of an AND/OR tree structure of the assembly; evaluating feasible assembly sequences obtained from the CRD by the evaluation function $$E(q)=W_h \cdot f(H(q))+W_j \cdot f(J(q))+W_t \cdot f(T(q))$$

where q is an assembly sequence, E(q) is an evaluation function, $W_h$, $W_j$ and $W_t$ are weighting factors for ease of part handling, ease of part joining, and tool changes criteria, respectively, f is a scaling function, H(q) is the sum of the weights of all subassemblies for the assembly sequence q, J(q) is a number of joining direction changes for the assembly sequence q, T(q) is the number of tool changes for the assembly sequence q; and performing assembly in the assembly sequences depending on the evaluation result.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Figure 1:
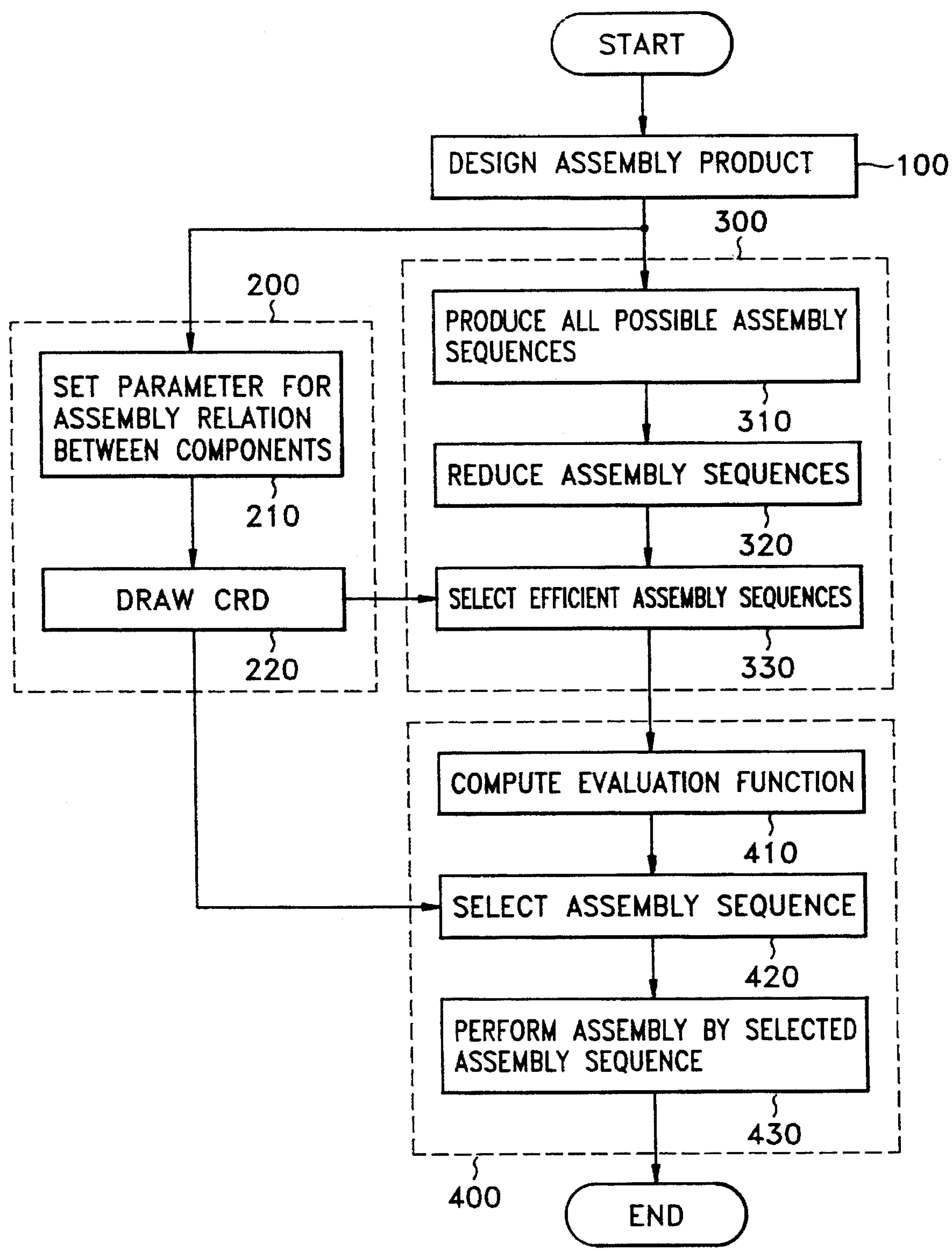
FIG. 1 is a flowchart showing the evaluation method of assembly sequences according to the present invention.

In FIG. 1, the evaluation method of assembly sequences includes the steps of designing an assembly product (step 100), expressing assembly relation of the parts composing the assembly product in data which is identifiable by a computer (step 200), selecting only efficiently valuable assembly sequences among numerous possible assembly sequences (step 300), and evaluating the respective assembly sequences objectively and efficiently (step 400).

Step 200 consists of the steps of setting parameters indicating an assembly relation between the respective parts (step 210) and preparing CRD indicating an assembly relation between the respective parts (step 220). Step 300 consists of the steps of generating all possible assembly sequences (step 310), finding efficient assembly sequences and reducing sequences (step 320) and determining efficient assembly sequences (step 330). Step 400 consists of the steps of computing an evaluation function (step 410), selecting assembly sequences (step 420) and performing assembly depending on the selected assembly sequences (step 430).

In this manner, the most efficient assembly sequence is finally selected.

Now, the evaluation criteria of assembly sequences will be explained.

Criterion 1

Equipment constraint (measured by weight): It is determined whether or not the current assembly equipment (e.g., a robot) is capable of handling the respective subassemblies/parts, and excludes from the alternatives the assembly sequences containing subassemblies which cannot be handled.

Criterion 2

Ease of part handling (measured by weight): The heavier a part is, the more difficult it is to handle. Since heavier and lighter subassemblies may be generated depending on the respective assembly sequences, the assembly sequences should be evaluated accordingly.

Criterion 3

Ease of part joining (measured by the number of joining direction changes): The number of joining direction changes is proportionate to the amount of user intervention and the number of fixture changes. Thus, it is preferable to select the assembly sequences having few joining direction changes.

Criterion 4

Tool changes (measured by the number of tool changes): Fewer tool changes saves set-up time and the amount of user intervention.

Next, the development of a data structure for expressing the assembly relation between parts will be described.

In order to evaluate the respective assembly sequences, there is a prerequisite need of a data structure the assembly state of the respective parts of which is identifiable by a computer. For this purpose, a component relation diagram (CRD) is developed.

The most current evaluation system requires too much user intervention. This is because the system requires information about all subassemblies and corresponding assembly operations. Since the maximum number of possible subassemblies in a product composed of n components is $$\sum_{i=1}^{n} nC_i,$$

it increases exponentially with the increase in the number of components. Thus, the amount of information about subassemblies also increases exponentially with the number of components. In addition, the number of assembly operations is greater than that of subassemblies because multiple assembly tasks usually correspond to one subassembly. The CRD requires only the information about parts and minimal user intervention.

Figure 2:
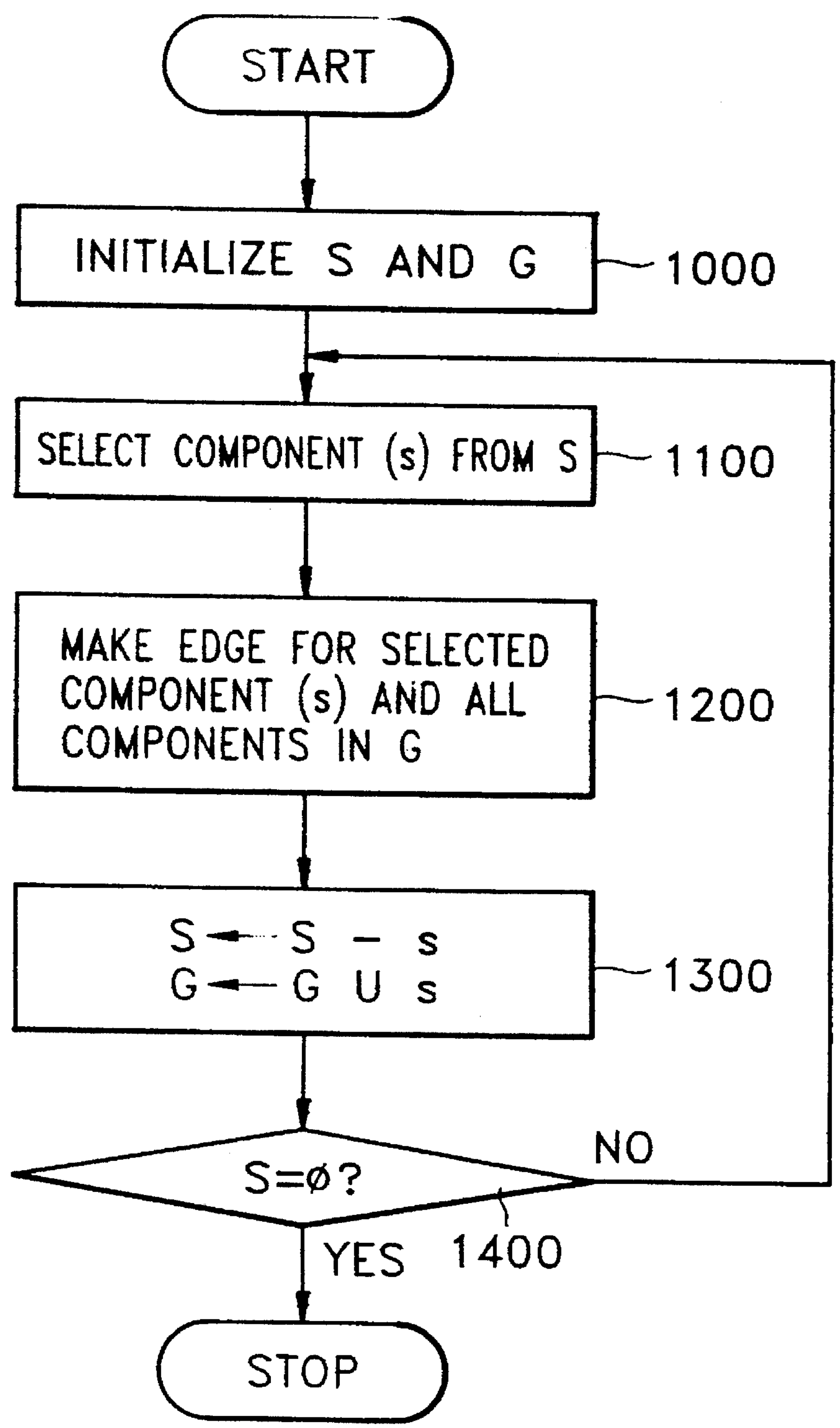
FIG. 2 is a flowchart showing the generation process of component structure in a component relation diagram (CRD)

FIG. 2 is a flowchart for explaining the generation method of a CRD. Here, initialization is performed whereby S becomes the set of all components in an assembly and G is set to $\phi$ (step 1000). A component s is arbitrarily chosen from the set S (step 1100). An edge is made with respect to the chosen component s and all components in G (step 1200). New values of S and G are obtained in accordance with $S \leftarrow S-s$ and $G \leftarrow G \cup s$ (step 1300). Steps 1100 through 1300 are repeated until S equals $\phi$ (step 1400).

The component relation diagram G=(N, E, NA, EA) consists of a set of nodes N, a set of edges E, a set of node attributes NA, and a set of edge atrributes EA. Each node in a CRD corresponds to a component of an assembly, and each edge corresponds to the joining relation between two components. If there is no joining operation requirement between two components, no edge exists between them. Each edge is either directed or undirected. The starting node associated with a directed edge indicates a base component to the terminal node. Each node attribute corresponds to a property of a component and each edge attribute corresponds to the information about the joining relation between two components.

Figure 3:
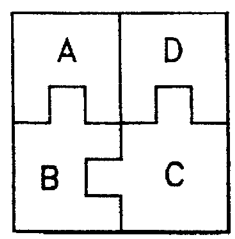
FIG. 3 is a schematic diagram for explaining an evaluation method of assembly sequences according to the present invention.
Figure 4:
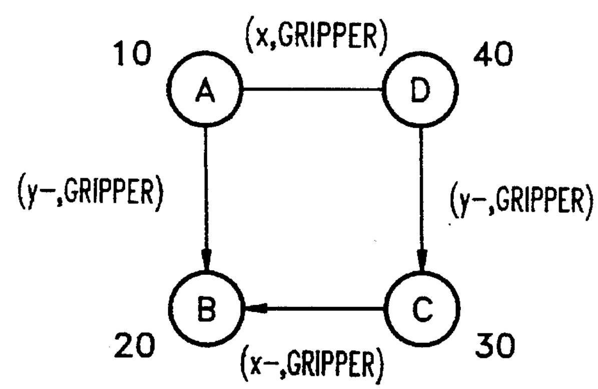
FIG. 4 is a component relation diagram of the assembly shown in FIG. 3.

FIG. 3 shows an imaginary assembly for explaining a CRD according to the present invention, showing an assembly consisting of nodes A, B, C and D. FIG. 4 is a CRD indicating edge attributes, node attributes, nodes and joining directions for the assembly shown in FIG. 3. In FIG. 4, A, B, C and D are nodes, 10, 20, 30 and 40 are node attributes, 1, 2, 3 and 4 are edge attributes, and x- and y- are joining directions, respectively.

Now, the following Tables 1 and 2 illustrate the assembly shown in FIG. 3 which is expressed as a CRD data structure, with Table 1 showing node attributes and Table 2 showing edge attributes.

TABLE 1

| | part | | base |
|---|---|---|---|
| edge | i | j | part |
| 1 | A | B | B |
| 2 | B | C | B |
| 3 | C | D | C |
| 4 | A | D | A or D |

TABLE 2

| part | weight |
|---|---|
| A | 10 |
| B | 20 |
| C | 30 |
| D | 40 |

In a method of constructing feasible assembly sequences, all possible assembly sequences of an imaginary assembly composed of N parts increases enormously with the increase in the number of parts. Therefore, all possible assembly sequences performed by joining all parts and subassemblies should be generated, which is possible by using data provided by various existing systems. The invention will be described by using the data structure of an AND/OR graph disclosed in a paper by L. S. Homem de Mello (see *IEEE Transactions on Robotics and Automation*, Vol.7, No.5, October 1991). The AND/OR graph contains information on all assembly sequences and the contents of the data structure thereof have all assembly sequences. In all imaginary assembly sequences, a best assembly sequence for all assembly sequences can be selected by passing through an evaluating step directly without passing through a reduction step to be described later.

However, in the case of an assembly having numerous parts, if infeasible assemblies are also evaluated, too many assembly sequences should be evaluated, thereby lowering the evaluation efficiency. Therefore, according to the present invention, in order to secure an efficient evaluation, there is provided a reducing step for evaluating only the feasible assembly sequences by deleting the imaginary assembly sequences containing the infeasible cases due to factors such as an equipment constraint, in the step prior to evaluating the efficiency of imaginary assembly process. To accomplish the reduction step, in the present invention, only the practically feasible assembly sequences are evaluated in the following evaluation step, by deleting the infeasible assembly sequences which are logically impossible to obtain due to the equipment constraint among all assembly sequences expressed in the AND/OR graph. Thus, the assembly sequences become simplified, as compared with the conventional one.

The process of finding feasible assembly sequences will now be described.

There are numerous assembly sequences for any given assembly. Theoretically, the number of assembly sequences increases depending on the increase in the number of parts and this increase is enormous. However, among the vast number of assembly sequences, only those practically feasible need be considered. Thus, a reduced number of sequences can be obtained by deleting the logically infeasible assembly sequences from among all the sequences, using a reduction procedure. The reduction procedure consists of the following steps:

Step 1. Using the weight information of the CRD, the weight of each subassembly in an AND/OR tree is computed.

Step 2. If a subassembly has a weight greater than the upper limit of the weight which can be handled by the current equipment, it is determined to be a subassembly which is infeasible for handling.

Step 3. All assembly sequences containing infeasible subassemblies are deleted.

Figure 5:
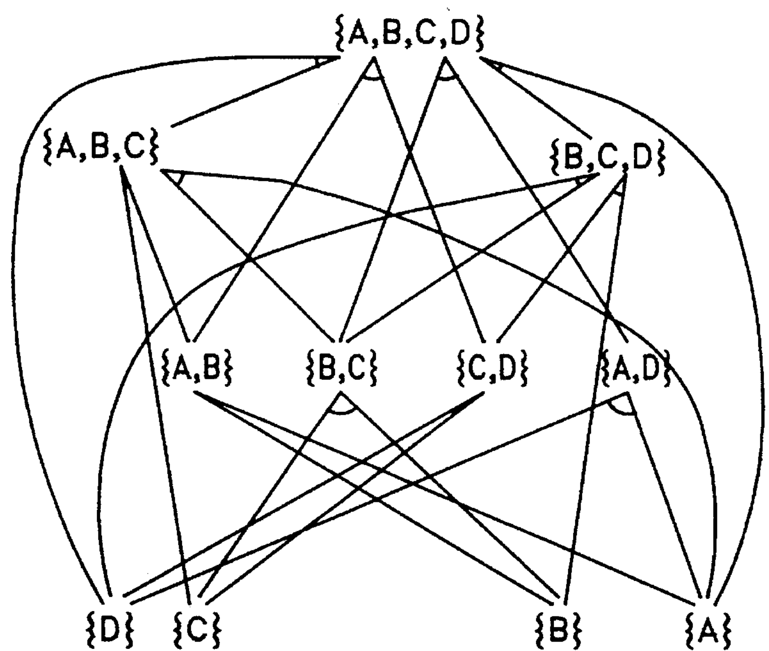
FIG. 5 is an AND/OR graph showing all possible assembly sequences of the assembly shown in FIG. 3.
Figure 6:
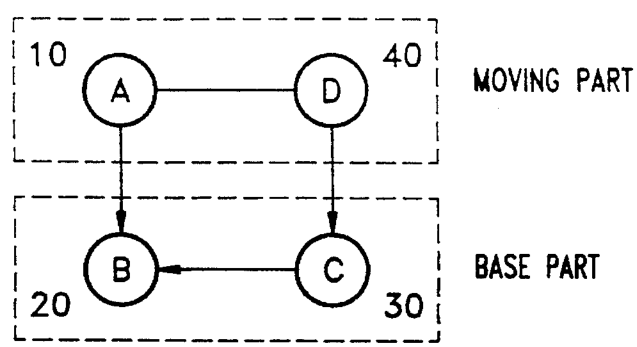
FIG. 6 shows infeasible subassemblies {A,D} of the assembly shown in FIG. 3.
Figure 7:
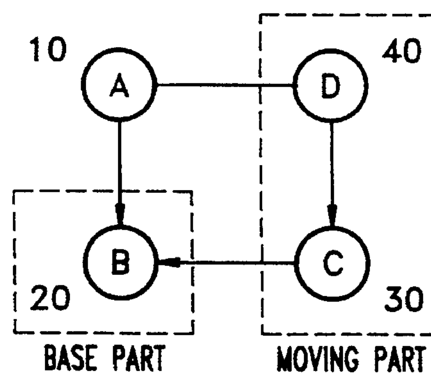
FIG. 7 shows infeasible subassemblies {C,D} of the assembly shown in FIG. 3.
Figure 8:
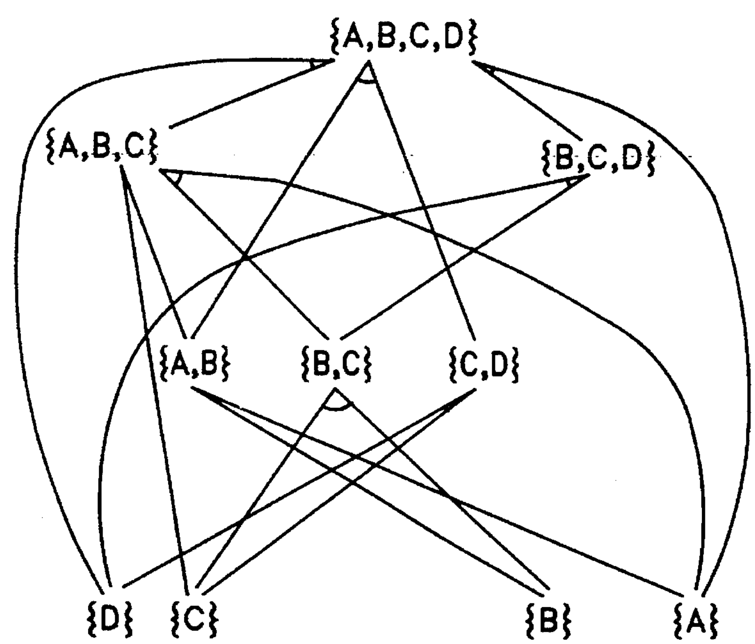
FIG. 8 is an AND/OR graph showing only the feasible assembly sequences of the assembly shown in FIG. 5.

FIG. 5 is a chart for showing all imaginary assembly sequences expressed in an AND/OR tree data structure of the assembly shown in FIG. 3, while FIG. 8 shows only the feasible assembly sequences and excludes infeasible subassemblies {A,D} and {C,D} as shown in FIGS. 6 and 7.

Next, the steps of setting and computing an evaluation function for each assembly sequence will be described.

The evaluation values of the respective possible assembly sequences obtained in the above step are obtained from the CRD values by the following evaluation function:

$$E(q)=W_h \cdot f(H(q))+W_j \cdot f(J(q))+W_t \cdot f(T(q)) \quad (1)$$

where q is an assembly sequence; f is a scale function; $W_h$, $W_j$ and $W_t$ are weighting factors for ease of part handling, ease of part joining, and tool changes criteria, respectively, satisfying $W_h+W_j+W_t=1$ and assuming that Wh, Wj, Wt are each greater than zero; and H, J and T are the evaluation functions based on ease of part handling, ease of part joining, and tool changes criteria, respectively, such that H(q) is the sum of the weights of all subassemblies in the assembly sequence q, J(q) is the number of joining direction changes, and T(q) is the number of tool changes.

That is to say, assuming the value of E to be defined as $0 \leqq E \leqq 100$, the scale function is expressed as $$f(X) = 100\left(\frac{X_{max}-X}{X_{max}-X_{min}}\right)$$

for $X_{min} \leqq X \leqq X_{max}$.

Hereinbelow, the computing procedure of H(q), J(q) and T(q) will be described.

First, the procedure for computing H(q) is as follows:

Step 1. Using the weight information of the CRD, the weight of each subassembly in an AND/OR tree is computed.

Step 2. For all assembly sequences q, H(q) is computed as follows:

$$H(q) = \sum_{s \in A_q} W_s$$

where $A_q$ is a set of subassemblies in the assembly sequence q, and $W_s$ is the weight of a subassembly s.

For the evaluation based on the ease of part joining, the assembly sequence which requires fewer joining direction changes is preferred because it avoids extra manipulation to reorient the workpiece, simplifies the fixture, and requires less operational dexterity. Thus, the criterion is to minimize the number of joining direction changes and the number of reorientations.

The evaluation function J(q) is the number of joining direction changes that occur during the execution of an assembly sequence q. (Here, as many assemblies need multiple joining directions, e.g., various diagonal directions, let us consider six joining directions.)

The procedure for computing J(q) is as follows:

Step 1. For an assembly sequence q, consider a subassembly s in q. Suppose the subassembly s consists of two subassemblies $s_1$ and $s_2$. Let Cs, Cs1 and Cs2 be the set of components in the subassemblies s, $s_1$ and $s_2$, respectively. Then, using the CRD, we construct the set of joining directions Ds as follows:

$$D_s = \bigcup_{i \in E_s} JA_i$$

where Es is the set of edges connected between Cs1 and Cs2 in a CRD, and $JA_i$ is the joining attribute on edge i in a CRD.

Step 2. Then, J(q) is computed as follows:

$$J(q) = \sum_{s \in A_q} X_s$$

wherein, if s is a leaf subassembly, $X_s=0$, and if s is not a leaf subassembly, then $X_s=n_s-1$ for $D_s \cap D_{P(s)} \neq \phi$ and $X_s=n_s$ for $D_s \cap D_{P(s)}=\phi$, and where $n_s$ is the number of different directions in $D_s$, P(s) is a set of direct predecessors of subassembly s, $X_s$ is an indicator variable representing the changes of joining directions for subassembly s, and $A_q$ is a set of subassemblies in q.

For the evaluation based on the tool changes, the assembly sequence which requires the least number of tool changes is preferred because it reduces the set-up time for tool change and avoids extra operations to change the tools. Thus, the criterion is to minimize the number of tool changes.

The evaluation function T(q) is the number of tool changes that occur during the execution of an assembly sequences q. The procedure for computing T(q) is as follows:

Step 1. For an assembly sequence q, consider a subassembly s in q. Suppose the subassembly s consists of two subassemblies $s_1$ and $s_2$. Let $C_s$, $C_{s1}$ and $C_{s2}$ be the set of components in the subassemblies s, $s_1$ and $s_2$, respectively. Then, using the CRD, we construct $T_s$, the set of tools for subassembly s, as follows:

$$T_s = \bigcup_{i \in E_s} TA_i$$

where $E_s$ is the set of edges connected between $C_{s1}$ and $C_{s2}$ in a CRD, and $TA_i$ is the tool attribute on edge i in a CRD.

Step 2. T(q) is computed as follows:

$$T(q) = \sum_{s \in A_q} Y_s$$

wherein, if s is a leaf subassembly, $Y_s=0$, and if s is not a leaf subassembly, $Y_s=n(T_s-T_{P(s)})$, and where P(s) is a set of direct predecessors of subassembly s, $Y_s$ is an indicator variable representing the changes of tools for subassembly s, $n(T_s-T_{P(s)})$ is the number of elements in the set $T_s-T_{P(s)}$, and $A_q$ is a set of subassemblies in q.

Lastly, the procedure for constructing the most efficient assembly sequence will now be described.

The evaluation values for the respective feasible assembly sequences, which are obtained in the above steps, are compared, and the most efficient value is selected by the following computing procedure: first, for the respective assembly sequences, the evaluation function value E is computed; second, an assembly sequence q* having the largest evaluation function value is selected; that is to say, the value of q* satisfying $E(q^*) \geqq E(q)$ for all assembly sequences q.

Figure 9:
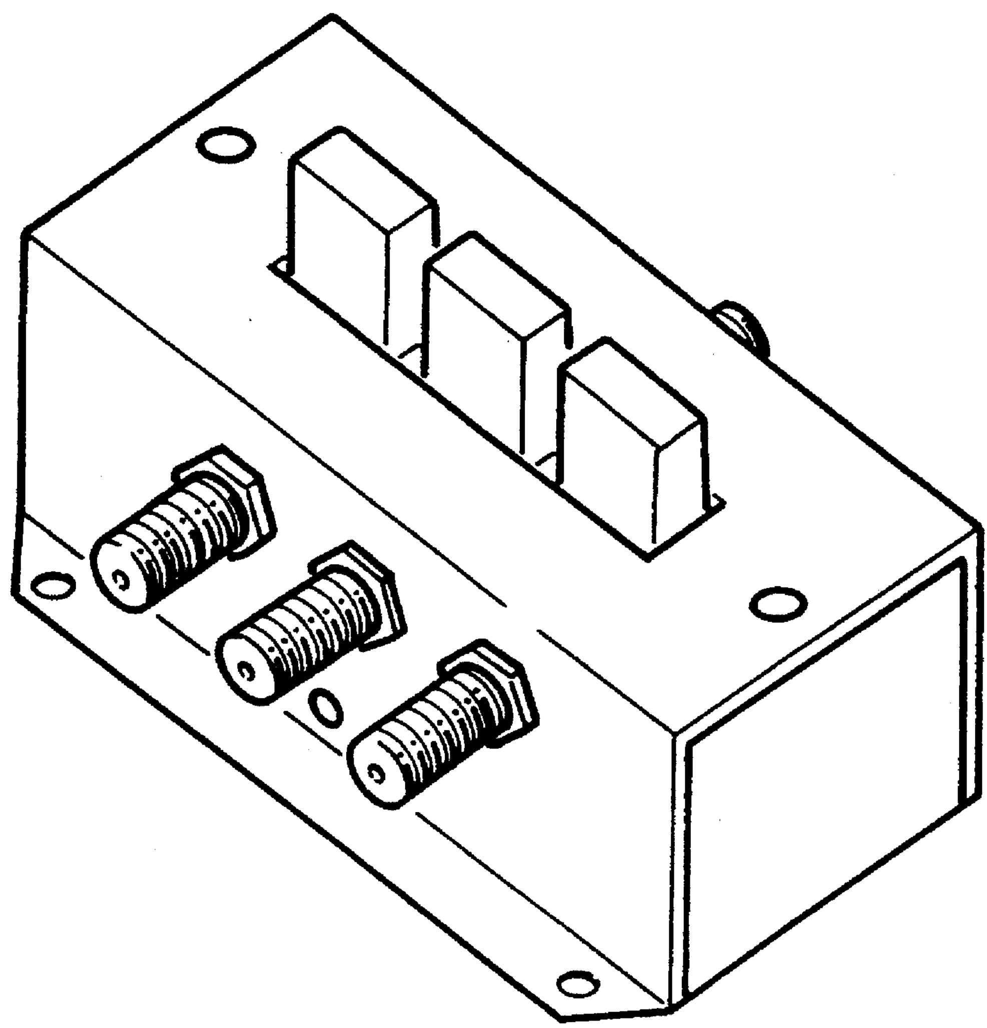
FIG. 9 is an assembled product accomplished according to the present invention.
Figure 10:
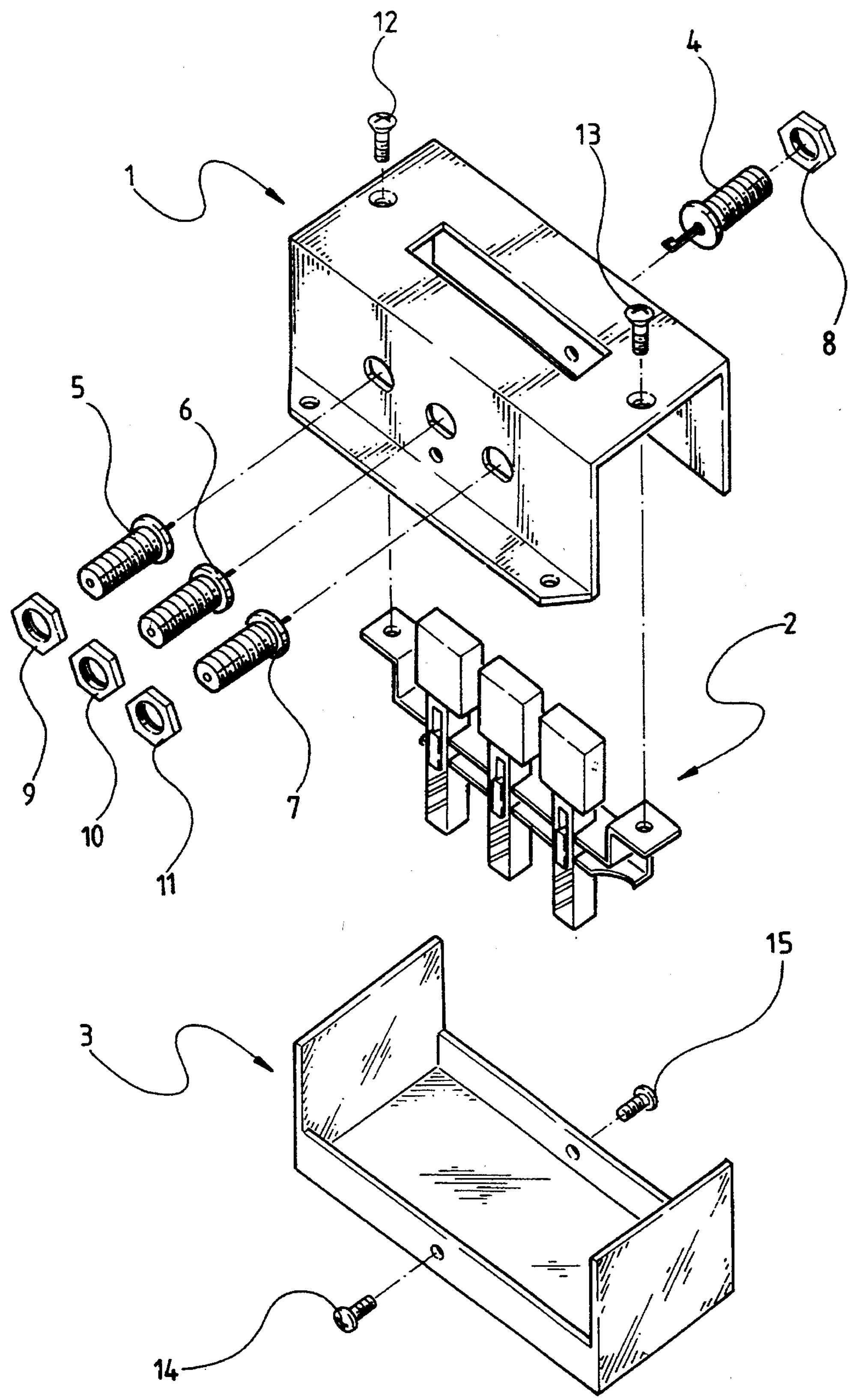
FIG. 10 is a structural diagram showing the assembly relation of the assembly of FIG. 9.

FIG. 9 is an assembled product (a switch) accomplished according to the present invention;

FIG. 10 shows the configuration of the switch for explaining the evaluation method of the assembly sequences according to the present invention.

The following Table 3 indicates edge attributes in the CRD wherein T1, T2 and T3 are each tools for assembly. Table 4 indicates node attributes in the CRD.

TABLE 3

| edge | component pairs i | component pairs j | base component | joining direction | tools |
|---|---|---|---|---|---|
| 1 | 1 | 2 | 1 | z+ | |
| 2 | 1 | 3 | 3 | z− | |
| 3 | 1 | 4 | 1 | x− | |
| 4 | 1 | 5 | 1 | x+ | |
| 5 | 1 | 6 | 1 | x+ | |
| 6 | 1 | 7 | 1 | x+ | |
| 7 | 1 | 12 | 1 | z− | T1 |
| 8 | 1 | 13 | 1 | z− | T1 |
| 9 | 1 | 14 | 1 | x− | T1 |
| 10 | 1 | 15 | 1 | x+ | T1 |
| 11 | 2 | 4 | 0 | x+ | T2 |
| 12 | 2 | 5 | 0 | x+ | T2 |
| 13 | 2 | 6 | 0 | x+ | T2 |
| 14 | 2 | 7 | 0 | X+ | T2 |
| 15 | 4 | 8 | 4 | x+ | T3 |
| 16 | 5 | 9 | 5 | x− | T3 |
| 17 | 6 | 10 | 6 | x− | T3 |
| 18 | 7 | 11 | 7 | x− | T3 |

TABLE 4

| component (or node) | name | weight (in grams) |
|---|---|---|
| 1 | upper case | 61.7 |
| 2 | button-set | 18.0 |
| 3 | lower case | 50.5 |
| 4, 5, 6, 7 | connector | 3.5 |
| 8, 9, 10, 11 | nut | 0.7 |
| 12, 13, 14, 15 | screw | 0.5 |

TABLE 5

| sequence number | H | J | T | rank R1 | rank R2 | rank R3 | rank R4 |
|---|---|---|---|---|---|---|---|
| 45 | 1378.1 | 7 | 4 | (9) | (52) | 3 | 4 |
| 46 | 1369.7 | 7 | 5 | (16) | (27) | 4 | (56) |
| 53 | 1328.1 | 7 | 4 | 1 | (12) | 1 | 1 |
| 54 | 1319.7 | 7 | 5 | 2 | 3 | 2 | (49) |
| 113 | 1328.1 | 10 | 4 | (7) | (23) | (67) | 2 |
| 115 | 1316.9 | 8 | 5 | 3 | 1 | (6) | (50) |
| 117 | 1314.1 | 8 | 6 | (14) | 4 | (12) | (121) |
| 175 | 1316.9 | 8 | 5 | 3 | 1 | (7) | (51) |
| 180 | 1314.1 | 8 | 6 | (15) | 4 | (13) | (122) |

TABLE 6

| sequence number | sequences |
|---|---|
| 45 | (((((((((((((1,4)5)6)7)8)9)10)11)2)13)3)12)14)15) |
| 46 | (((((((((((((1,4)8)5)6)7)9)10)11)2)13)3)12)14)15) |
| 53 | (((((((((((((1,4)5)6)7)8)9)10)11)2)12)13)3)14)15) |
| 54 | (((((((((((((1,4)8)5)6)7)9)10)11)2)12)13)3)14)15) |
| 114 | (((((((((((((1,5)4)6)7)9)8)10)11)2)12)13)3)14)15) |
| 115 | (((((((((((((1,5)4)9)8)6)7)10)11)2)12)13)3)14)15) |
| 117 | (((((((((((((1,5)9)4)8)6)7)10)11)2)12)13)3)14)15) |
| 175 | (((((((((((((1,6)5)10)9)4)7)8)11)2)12)13)3)14)15) |
| 180 | (((((((((((((1,6)5)10)9)4)8)7)11)2)12)13)3)14)15) |

In the above Table 5, H is the total sum of weights of subassemblies with a range [1311.3, 1419.7], J is the total number of joining direction changes with a range [7, 14], T is the total number of tool changes with a range [4, 7], R1 is a rank at weighting factor for (1/3, 1/3, 1/3), R2 is a rank at weighting factor for (0.8, 0.1, 0.1), R3 is a rank at weighting factor for (0.1, 0.8, 0.1), R4 is a rank at weighting factor for (0.1, 0.1, 0.8), and ( ) is the lower rank than the fourth at each weighting factor.

The above Table 5 indicates the selected assembly sequences for a switch. That is to say, 180 feasible assembly sequences are generated for a switch composed of fifteen components. The evaluation is performed by the evaluation function as expressed in equation (1) above, the thirty upper assembly sequences are selected. Table 10 indicates the thirty selected assembly sequences for the case where Wh, Wj and Wt are (1/3, 1/3, 1/3), respectively. Among them, the values H, J and T and ranks of the selected assembly sequences are as indicated in Table 5. Table 6 indicates the assembly sequences of the selected sequence numbers.

TABLE 7

| | | |
|---|---|---|
| 1. | 53 | (((((((((((((1,4)5)6)7)8)9)10)11)2)12)13)3)14)15) |
| 2. | 54 | (((((((((((((1,4)8)5)6)7)9)10)11)2)12)13)3)14)15) |
| 3. | 115 | (((((((((((((1,5)4)9)8)6)7)10)11)2)12)13)3)14)15) |
| 4. | 175 | (((((((((((((1,6)5)10)9)4)7)8)11)2)12)13)3)14)15) |
| 5. | 114 | (((((((((((((1,5)4)6)7)9)8)10)11)2)12)13)3)14)15) |

TABLE 8

| rank | sequence number | E | H | J | T |
|---|---|---|---|---|---|
| 1 | 53 | 91.7 | 1328.1 | 7 | 4 |
| 2 | 54 | 83.8 | 1319.7 | 7 | 5 |
| 3 | 115 | 80.1 | 1316.9 | 8 | 5 |
| 4 | 175 | 80.1 | 1316.9 | 8 | 5 |
| 5 | 114 | 79.2 | 1319.7 | 8 | 5 |

Table 7 indicates the five best assembly sequences for a switch in the case where $W_h$, $W_j$ and $W_t$ are (1/3, 1/3, 1/3), respectively.

Table 8 indicates the evaluation result in the case where $W_h$, $W_j$ and $W_t$ are (1/3, 1/3, 1/3), respectively. Here, the values of H, J and T are the same as those of H, J and T shown in Table 5, respectively, and E is the evaluation score of assembly sequences with a range [17.6, 91.7]. From Table 8, sequence number 53 is considered the best sequence.

TABLE 9

| sequence number | sequence |
|---|---|
| 1 | ((((((((((((((1,4)8)5)6)7)9)10)11)2)3)14)15)13)12) |
| 2 | ((((((((((((((1,4)5)8)9)6)7)10)11)2)3)14)15)13)12) |
| 3 | ((((((((((((((1,4)5)6)8)9)10)7)11)2)3)14)15)13)12) |
| 4 | ((((((((((((((1,4)8)5)9)6)7)10)11)2)3)14)15)13)12) |
| 5 | ((((((((((((((1,4)8)5)6)9)10)7)11)2)3)14)15)13)12) |
| 6 | ((((((((((((((1,4)8)5)9)6)10)7)11)2)3)14)15)13)12) |
| 7 | ((((((((((((((1,4)5)8)9)6)10)7)11)2)3)14)15)13)12) |
| 8 | ((((((((((((((1,4)8)5)6)7)9)10)11)2)3)14)12)15)13) |
| 9 | ((((((((((((((1,4)5)8)9)6)7)10)11)2)3)14)12)15)13) |
| 10 | ((((((((((((((1,4)5)6)8)9)10)7)11)2)3)14)12)15)13) |
| 11 | ((((((((((((((1,4)8)5)9)6)7)10)11)2)3)14)12)15)13) |
| 12 | ((((((((((((((1,4)8)5)6)9)10)7)11)2)3)14)12)15)13) |
| 13 | ((((((((((((((1,4)8)5)9)6)10)7)11)2)3)14)12)15)13) |
| 14 | ((((((((((((((1,4)5)8)9)6)10)7)11)2)3)14)12)15)13) |
| 15 | ((((((((((((((1,4)8)5)6)7)9)10)11)2)3)13)14)12)15) |
| 16 | ((((((((((((((1,4)5)8)9)6)7)10)11)2)3)13)14)12)15) |
| 17 | ((((((((((((((1,4)5)6)8)9)10)7)11)2)3)13)14)12)15) |
| 18 | ((((((((((((((1,4)8)5)9)6)7)10)11)2)3)13)14)12)15) |
| 19 | ((((((((((((((1,4)8)5)6)9)10)7)11)2)3)13)14)12)15) |
| 20 | ((((((((((((((1,4)8)5)9)6)10)7)11)2)3)13)14)12)15) |
| 21 | ((((((((((((((1,4)5)8)9)6)10)7)11)2)3)13)14)12)15) |
| 22 | ((((((((((((((1,4)8)5)6)7)9)10)11)2)3)13)12)14)15) |
| 23 | ((((((((((((((1,4)5)8)9)6)7)10)11)2)3)13)12)14)15) |
| 24 | ((((((((((((((1,4)5)6)8)9)10)7)11)2)3)13)12)14)15) |
| 25 | ((((((((((((((1,4)8)5)9)6)7)10)11)2)3)13)12)14)15) |
| 26 | ((((((((((((((1,4)8)5)6)9)10)7)11)2)3)13)12)14)15) |
| 27 | ((((((((((((((1,4)8)5)9)6)10)7)11)2)3)13)12)14)15) |
| 28 | ((((((((((((((1,4)5)8)9)6)10)7)11)2)3)13)12)14)15) |
| 29 | ((((((((((((((1,4)5)6)7)8)9)10)11)2)13)3)14)12)15) |
| 30 | ((((((((((((((1,4)8)5)6)7)9)10)11)2)13)3)14)12)15) |
| 31 | ((((((((((((((1,4)5)8)9)6)7)10)11)2)13)3)14)12)15) |
| 32 | ((((((((((((((1,4)5)6)8)9)10)7)11)2)13)3)14)12)15) |
| 33 | ((((((((((((((1,4)8)5)9)6)7)10)11)2)13)3)14)12)15) |
| 34 | ((((((((((((((1,4)8)5)6)9)10)7)11)2)13)3)14)12)15) |
| 35 | ((((((((((((((1,4)8)5)9)6)10)7)11)2)13)3)14)12)15) |
| 36 | ((((((((((((((1,4)5)8)9)6)10)7)11)2)13)3)14)12)15) |
| 37 | ((((((((((((((1,4)5)6)7)8)9)10)11)2)13)3)14)15)12) |
| 38 | ((((((((((((((1,4)8)5)6)7)9)10)11)2)13)3)14)15)12) |
| 39 | ((((((((((((((1,4)5)8)9)6)7)10)11)2)13)3)14)15)12) |
| 40 | ((((((((((((((1,4)5)6)8)9)10)7)11)2)13)3)14)15)12) |
| 41 | ((((((((((((((1,4)8)5)9)6)7)10)11)2)13)3)14)15)12) |
| 42 | ((((((((((((((1,4)8)5)6)9)10)7)11)2)13)3)14)15)12) |
| 43 | ((((((((((((((1,4)8)5)9)6)10)7)11)2)13)3)14)15)12) |
| 44 | ((((((((((((((1,4)5)8)9)6)10)7)11)2)13)3)14)15)12) |
| 45 | ((((((((((((((1,4)5)6)7)8)9)10)11)2)13)3)12)14)15) |
| 46 | ((((((((((((((1,4)8)5)6)7)9)10)11)2)13)3)12)14)15) |
| 47 | ((((((((((((((1,4)5)8)9)6)7)10)11)2)13)3)12)14)15) |
| 48 | ((((((((((((((1,4)5)6)8)9)10)7)11)2)13)3)12)14)15) |
| 49 | ((((((((((((((1,4)8)5)9)6)7)10)11)2)13)3)12)14)15) |
| 50 | ((((((((((((((1,4)8)5)6)9)10)7)11)2)13)3)12)14)15) |
| 51 | ((((((((((((((1,4)8)5)9)6)10)7)11)2)13)3)12)14)15) |
| 52 | ((((((((((((((1,4)5)8)9)6)10)7)11)2)13)3)12)14)15) |
| 53 | ((((((((((((((1,4)5)6)7)8)9)10)11)2)12)13)3)14)15) |
| 54 | ((((((((((((((1,4)8)5)6)7)9)10)11)2)12)13)3)14)15) |
| 55 | ((((((((((((((1,4)5)8)9)6)7)10)11)2)12)13)3)14)15) |
| 56 | ((((((((((((((1,4)5)6)8)9)10)7)11)2)12)13)3)14)15) |
| 57 | ((((((((((((((1,4)8)5)9)6)7)10)11)2)12)13)3)14)15) |
| 58 | ((((((((((((((1,4)8)5)6)9)10)7)11)2)12)13)3)14)15) |
| 59 | ((((((((((((((1,4)8)5)9)6)10)7)11)2)12)13)3)14)15) |
| 60 | ((((((((((((((1,4)5)8)9)6)10)7)11)2)12)13)3)14)15) |
| 61 | ((((((((((((((1,5)9)4)6)7)8)10)11)2)3)14)15)13)12) |
| 62 | ((((((((((((((1,5)4)9)8)6)7)10)11)2)3)14)15)13)12) |
| 63 | ((((((((((((((1,5)4)6)9)8)10)7)11)2)3)14)15)13)12) |
| 64 | ((((((((((((((1,5)9)4)8)6)7)10)11)2)3)14)15)13)12) |
| 65 | ((((((((((((((1,5)9)4)6)8)10)7)11)2)3)14)15)13)12) |
| 66 | ((((((((((((((1,5)9)4)8)6)10)7)11)2)3)14)15)13)12) |
| 67 | ((((((((((((((1,5)4)9)8)6)10)7)11)2)3)14)15)13)12) |
| 68 | ((((((((((((((1,5)9)4)6)7)8)10)11)2)3)14)12)15)13) |
| 69 | ((((((((((((((1,5)4)9)8)6)7)10)11)2)3)14)12)15)13) |
| 70 | ((((((((((((((1,5)4)6)9)8)10)7)11)2)3)14)12)15)13) |
| 71 | ((((((((((((((1,5)9)4)8)6)7)10)11)2)3)14)12)15)13) |
| 72 | ((((((((((((((1,5)9)4)6)8)10)7)11)2)3)14)12)15)13) |
| 73 | ((((((((((((((1,5)9)4)8)6)10)7)11)2)3)14)12)15)13) |
| 74 | ((((((((((((((1,5)4)9)8)6)10)7)11)2)3)14)12)15)13) |
| 75 | ((((((((((((((1,5)9)4)6)7)8)10)11)2)3)13)14)12)15) |
| 76 | ((((((((((((((1,5)4)9)8)6)7)10)11)2)3)13)14)12)15) |
| 77 | ((((((((((((((1,5)4)6)9)8)10)7)11)2)3)13)14)12)15) |
| 78 | ((((((((((((((1,5)9)4)8)6)7)10)11)2)3)13)14)12)15) |
| 79 | ((((((((((((((1,5)9)4)6)8)10)7)11)2)3)13)14)12)15) |
| 80 | ((((((((((((((1,5)9)4)8)6)10)7)11)2)3)13)14)12)15) |
| 81 | ((((((((((((((1,5)4)9)8)6)10)7)11)2)3)13)14)12)15) |
| 82 | ((((((((((((((1,5)9)4)6)7)8)10)11)2)3)13)12)14)15) |
| 83 | ((((((((((((((1,5)4)9)8)6)7)10)11)2)3)13)12)14)15) |
| 84 | ((((((((((((((1,5)4)6)9)8)10)7)11)2)3)13)12)14)15) |
| 85 | ((((((((((((((1,5)9)4)8)6)7)10)11)2)3)13)12)14)15) |
| 86 | ((((((((((((((1,5)9)4)6)8)10)7)11)2)3)13)12)14)15) |
| 87 | ((((((((((((((1,5)9)4)8)6)10)7)11)2)3)13)12)14)15) |
| 88 | ((((((((((((((1,5)4)9)8)6)10)7)11)2)3)13)12)14)15) |
| 89 | ((((((((((((((1,5)4)6)7)9)8)10)11)2)13)3)14)12)15) |
| 90 | ((((((((((((((1,5)9)4)6)7)8)10)11)2)13)3)14)12)15) |
| 91 | ((((((((((((((1,5)4)9)8)6)7)10)11)2)13)3)14)12)15) |
| 92 | ((((((((((((((1,5)4)6)9)8)10)7)11)2)13)3)14)12)15) |
| 93 | ((((((((((((((1,5)9)4)8)6)7)10)31)2)13)3)14)12)15) |
| 94 | ((((((((((((((1,5)9)4)6)8)10)7)11)2)13)3)14)12)15) |
| 95 | ((((((((((((((1,5)9)4)8)6)10)7)11)2)13)3)14)12)15) |
| 96 | ((((((((((((((1,5)4)9)8)6)10)7)11)2)13)3)14)12)15) |
| 97 | ((((((((((((((1,5)4)6)7)9)8)10)11)2)13)3)14)15)12) |
| 98 | ((((((((((((((1,5)9)4)6)7)8)10)11)2)13)3)14)15)12) |
| 99 | ((((((((((((((1,5)4)9)8)6)7)10)11)2)13)3)14)15)12) |
| 100 | ((((((((((((((1,5)4)6)9)8)10)7)11)2)13)3)14)15)12) |
| 101 | ((((((((((((((1,5)9)4)8)6)7)10)11)2)13)3)14)15)12) |
| 102 | ((((((((((((((1,5)9)4)6)8)10)7)11)2)13)3)14)15)12) |
| 103 | ((((((((((((((1,5)9)4)8)6)10)7)11)2)13)3)14)15)12) |
| 104 | ((((((((((((((1,5)4)9)8)6)10)7)11)2)13)3)14)15)12) |
| 105 | ((((((((((((((1,5)4)6)7)9)8)10)11)2)13)3)12)14)15) |
| 106 | ((((((((((((((1,5)9)4)6)7)8)10)11)2)13)3)12)14)15) |
| 107 | ((((((((((((((1,5)4)9)8)6)7)10)11)2)13)3)12)14)15) |
| 108 | ((((((((((((((1,5)4)6)9)8)10)7)11)2)13)3)12)14)15) |
| 109 | ((((((((((((((1,5)9)4)8)6)7)10)11)2)13)3)12)14)15) |
| 110 | ((((((((((((((1,5)9)4)6)8)10)7)11)2)13)3)12)14)15) |
| 111 | ((((((((((((((1,5)9)4)8)6)10)7)11)2)13)3)12)14)15) |
| 112 | ((((((((((((((1,5)4)9)8)6)10)7)11)2)13)3)12)14)15) |
| 113 | ((((((((((((((1,5)4)6)7)9)8)10)11)2)12)13)3)14)15) |
| 114 | ((((((((((((((1,5)9)4)6)7)8)10)11)2)12)13)3)14)15) |
| 115 | ((((((((((((((1,5)4)9)8)6)7)10)11)2)12)13)3)14)15) |
| 116 | ((((((((((((((1,5)4)6)9)8)10)7)11)2)12)13)3)14)15) |
| 117 | ((((((((((((((1,5)9)4)8)6)7)10)11)2)12)13)3)14)15) |
| 118 | ((((((((((((((1,5)9)4)6)8)10)7)11)2)12)13)3)14)15) |
| 119 | ((((((((((((((1,5)9)4)8)6)10)7)11)2)12)13)3)14)15) |
| 120 | ((((((((((((((1,5)4)9)8)6)10)7)11)2)12)13)3)14)15) |
| 121 | ((((((((((((((1,6)10)5)4)7)9)8)11)2)3)14)15)13)12) |
| 122 | ((((((((((((((1,6)5)10)9)4)7)8)11)2)3)14)15)13)12) |
| 123 | ((((((((((((((1,6)5)4)10)9)8)7)11)2)3)14)15)13)12) |
| 124 | ((((((((((((((1,6)10)5)9)4)7)8)11)2)3)14)15)13)12) |
| 125 | ((((((((((((((1,6)10)5)4)9)8)7)11)2)3)14)15)13)12) |
| 126 | ((((((((((((((1,6)10)5)9)4)8)7)11)2)3)14)15)13)12) |
| 127 | ((((((((((((((1,6)5)10)9)4)8)7)11)2)3)14)15)13)12) |
| 128 | ((((((((((((((1,6)10)5)4)7)9)8)11)2)3)14)12)15)13) |
| 129 | ((((((((((((((1,6)5)10)9)4)7)8)11)2)3)14)12)15)13) |
| 130 | ((((((((((((((1,6)5)4)10)9)8)7)11)2)3)14)12)15)13) |
| 131 | ((((((((((((((1,6)10)5)9)4)7)8)11)2)3)14)12)15)13) |
| 132 | ((((((((((((((1,6)10)5)4)9)8)7)11)2)3)14)12)15)13) |
| 133 | ((((((((((((((1,6)10)5)9)4)8)7)11)2)3)14)12)15)13) |
| 134 | ((((((((((((((1,6)5)10)9)4)8)7)11)2)3)14)12)15)13) |
| 135 | ((((((((((((((1,6)10)5)4)7)9)8)11)2)3)13)14)12)15) |
| 136 | ((((((((((((((1,6)5)10)9)4)7)8)11)2)3)13)14)12)15) |
| 137 | ((((((((((((((1,6)5)4)10)9)8)7)11)2)3)13)14)12)15) |
| 138 | ((((((((((((((1,6)10)5)9)4)7)8)11)2)3)13)14)12)15) |
| 139 | ((((((((((((((1,6)10)5)4)9)8)7)11)2)3)13)14)12)15) |
| 140 | ((((((((((((((1,6)10)5)9)4)8)7)11)2)3)13)14)12)15) |
| 141 | ((((((((((((((1,6)5)10)9)4)8)7)11)2)3)13)14)12)15) |
| 142 | ((((((((((((((1,6)10)5)4)7)9)8)11)2)3)13)12)14)15) |
| 143 | ((((((((((((((1,6)5)10)9)4)7)8)11)2)3)13)12)14)15) |
| 144 | ((((((((((((((1,6)5)4)10)9)8)7)11)2)3)13)12)14)15) |
| 145 | ((((((((((((((1,6)10)5)9)4)7)8)11)2)3)13)12)14)15) |
| 146 | ((((((((((((((1,6)10)5)4)9)8)7)11)2)3)13)12)14)15) |
| 147 | ((((((((((((((1,6)10)5)9)4)8)7)11)2)3)13)12)14)15) |
| 148 | ((((((((((((((1,6)5)10)9)4)8)7)11)2)3)13)12)14)15) |
| 149 | ((((((((((((((1,6)5)4)7)10)9)8)11)2)13)3)14)12)15) |
| 150 | ((((((((((((((1,6)10)5)4)7)9)8)11)2)13)3)14)12)15) |
| 151 | ((((((((((((((1,6)5)10)9)4)7)8)11)2)13)3)14)12)15) |
| 152 | ((((((((((((((1,6)5)4)10)9)8)7)11)2)13)3)14)12)15) |

TABLE 9-continued

| sequence number | sequence |
|---|---|
| 153 | ((((((((((((((1,6)10)5)9)4)7)8)11)2)13)3)14)12)15) |
| 154 | ((((((((((((((1,6)10)5)4)9)8)7)11)2)13)3)14)12)15) |
| 155 | ((((((((((((((1,6)10)5)9)4)8)7)11)2)13)3)14)12)15) |
| 156 | ((((((((((((((1,6)5)10)9)4)8)7)11)2)13)3)14)12)15) |
| 157 | ((((((((((((((1,6)5)4)7)10)9)8)11)2)13)3)14)15)12) |
| 158 | ((((((((((((((1,6)10)5)4)7)9)8)11)2)13)3)14)15)12) |
| 159 | ((((((((((((((1,6)5)10)9)4)7)8)11)2)13)3)14)15)12) |
| 160 | ((((((((((((((1,6)5)4)10)9)8)7)11)2)13)3)14)15)12) |
| 161 | ((((((((((((((1,6)10)5)9)4)7)8)11)2)13)3)14)15)12) |
| 162 | ((((((((((((((1,6)10)5)4)9)8)7)11)2)13)3)14)15)12) |
| 163 | ((((((((((((((1,6)10)5)9)4)8)7)11)2)13)3)14)15)12) |
| 164 | ((((((((((((((1,6)5)10)9)4)8)7)11)2)13)3)14)15)12) |
| 165 | ((((((((((((((1,6)5)4)7)10)9)8)11)2)13)3)12)14)15) |
| 166 | ((((((((((((((1,6)10)5)4)7)9)8)11)2)13)3)12)14)15) |
| 167 | ((((((((((((((1,6)5)10)9)4)7)8)11)2)13)3)12)14)15) |
| 168 | ((((((((((((((1,6)5)4)10)9)8)7)11)2)13)3)12)14)15) |
| 169 | ((((((((((((((1,6)10)5)9)4)7)8)11)2)13)3)12)14)15) |
| 170 | ((((((((((((((1,6)10)5)4)9)8)7)11)2)13)3)12)14)15) |
| 171 | ((((((((((((((1,6)10)5)9)4)8)7)11)2)13)3)12)14)15) |
| 172 | ((((((((((((((1,6)5)10)9)4)8)7)11)2)13)3)12)14)15) |
| 173 | ((((((((((((((1,6)5)4)7)10)9)8)11)2)12)13)3)14)15) |
| 174 | ((((((((((((((1,6)10)5)4)7)9)8)11)2)12)13)3)14)15) |
| 175 | ((((((((((((((1,6)5)10)9)4)7)8)11)2)12)13)3)14)15) |
| 176 | ((((((((((((((1,6)5)4)10)9)8)7)11)2)12)13)3)14)15) |
| 177 | ((((((((((((((1,6)10)5)9)4)7)8)11)2)12)13)3)14)15) |
| 178 | ((((((((((((((1,6)10)5)4)9)8)7)11)2)12)13)3)14)15) |
| 179 | ((((((((((((((1,6)10)5)9)4)8)7)11)2)12)13)3)14)15) |
| 180 | ((((((((((((((1,6)5)10)9)4)8)7)11)2)12)13)3)14)15) |

TABLE 10

| The thirty best assembly sequences for ($W_h$, $W_j$, $W_t$) = (⅓, ⅓, ⅓) are: | |
|---|---|
| ((((((((((((((1,4)5)6)7)8)9)10)11)2)12)13)3)14)15)<br>3 E = 91.7 H = 1328.1 J = 7 T = 4 | no. 5 |
| ((((((((((((((1,4)8)5)6)7)9)10)11)2)12)13)3)14)15)<br>4 E = 83.8 H = 1319.7 J = 7 T = 5 | no. 5 |
| ((((((((((((((1,5)4)9)8)6)7)10)11)2)12)13)3)14)15)<br>5 E = 80.1 H = 1316.9 J = 8 T = 5 | no. 11 |
| ((((((((((((((1,6)5)10)9)4)7)8)11)2)12)13)3)14)15)<br>5 E = 80.1 H = 1316.9 J = 8 T = 5 | no. 17 |
| ((((((((((((((1,5)9)4)6)7)8)10)11)2)12)13)3)14)15)<br>4 E = 79.2 H = 1319.7 J = 8 T = 5 | no. 11 |
| ((((((((((((((1,6)5)4)10)9)8)7)11)2)12)13)3)14)15)<br>6 E = 79.2 H = 1319.7 J = 8 T = 5 | no. 17 |
| ((((((((((((((1,5)4)6)7)9)8)10)11)2)12)13)3)14)15)<br>3 E = 78.0 H = 1328.1 J = 10 T = 4 | no. 11 |
| ((((((((((((((1,6)5)4)7)10)9)8)11)2)12)13)3)14)15)<br>3 E = 78.0 H = 1328.1 J = 10 T = 4 | no. 17 |
| ((((((((((((((1,4)5)6)7)8)9)10)11)2)13)3)12)14)15)<br>5 E = 76.4 H = 1378.1 J = 7 T = 4 | no. 4 |
| ((((((((((((((1,4)5)8)9)6)7)10)11)2)12)13)3)14)15)<br>5 E = 75.5 H = 1316.9 J = 9 T = 5 | no. 5 |
| ((((((((((((((1,4)5)6)8)9)10)7)11)2)12)13)3)14)15)<br>6 E = 74.7 H = 1319.7 J = 9 T = 5 | no. 5 |
| ((((((((((((((1,4)5)6)7)8)9)10)11)2)13)3)14)12)15)<br>9 E = 71.8 H = 1378.1 J = 8 T = 4 | no. 2 |
| ((((((((((((((1,4)5)6)7)8)9)10)11)2)13)3)14)15)12)<br>7 E = 71.8 H = 1378.1 J = 8 T = 4 | no. 3 |
| ((((((((((((((1,5)9)4)8)6)7)10)11)2)12)13)3)14)15)<br>7 E = 70.5 H = 1314.1 J = 8 T = 6 | no. 11 |
| ((((((((((((((1,6)5)10)9)4)8)7)11)2)12)13)3)14)15)<br>0 E = 70.5 H = 1314.1 J = 8 T = 6 | no. 18 |
| ((((((((((((((1,4)8)5)6)7)9)10)11)2)13)3)12)14)15)<br>6 E = 68.5 H = 1369.7 J = 7 T = 5 | no. 4 |
| ((((((((((((((1,4)8)5)9)6)7)10)11)2)12)13)3)14)15)<br>7 E = 65.9 H = 1314.1 J = 9 T = 6 | no. 5 |
| ((((((((((((((1,4)8)5)6)9)10)7)11)2)12)13)3)14)15)<br>8 E = 65.9 H = 1314.1 J = 9 T = 6 | no. 5 |
| ((((((((((((((1,5)4)9)8)6)7)10)11)2)13)3)12)14)15)<br>7 E = 64.7 H = 1366.9 J = 8 T = 5 | no. 10 |
| ((((((((((((((1,6)5)10)9)4)7)8)11)2)13)3)12)14)15)<br>7 E = 64.7 H = 1366.9 J = 8 T = 5 | no. 16 |

TABLE 10-continued

| The thirty best assembly sequences for ($W_h$, $W_j$, $W_t$) = (⅓, ⅓, ⅓) are: | |
|---|---|
| ((((((((((((((1,4)8)5)6)7)9)10)11)2)13)3)14)12)15)<br>0 E = 63.9 H = 1369.7 J = 8 T = 5 | no. 3 |
| ((((((((((((((1,4)8)5)6)7)8)10)11)2)13)3)14)15)12)<br>8 E = 63.9 H = 1369.7 J = 8 T = 5 | no. 3 |
| ((((((((((((((1,5)9)4)6)7)8)10)11)2)13)3)12)14)15)<br>6 E = 63.9 H = 1369.7 J = 8 T = 5 | no. 10 |
| ((((((((((((((1,6)5)4)10)9)8)7)11)2)13)3)12)14)15)<br>8 E = 63.9 H = 1369.7 J = 8 T = 5 | no. 16 |
| ((((((((((((((1,4)8)5)6)7)9)10)11)2)3)13)12)14)15)<br>2 E = 63.6 H = 1419.7 J = 7 T = 4 | no. 2 |
| ((((((((((((((1,5)4)6)7)9)8)10)11)2)13)3)12)14)15)<br>E = 62.6 H = 1378.1 J = 10 T = 4 | no. 10 |
| ((((((((((((((1,6)5)4)7)10)9)8)11)2)13)3)12)14)15)<br>5 E = 62.6 H = 1378.1 J = 10 T = 4 | no. 16 |
| ((((((((((((((1,5)9)4)6)8)10)7)11)2)12)13)3)14)15)<br>8 E = 61.3 H = 1314.1 J = 10 T = 6 | no. 11 |
| ((((((((((((((1,5)4)9)8)6)10)7)11)2)12)13)3)14)15)<br>0 E = 61.3 H = 1314.1 J = 10 T = 6 | no. 12 |
| ((((((((((((((1,6)10)5)9)4)7)6)11)2)12)13)3)14)15)<br>7 E = 61.3 H = 1314.1 J = 10 T = 6 | no. 17 |

Figure 11:
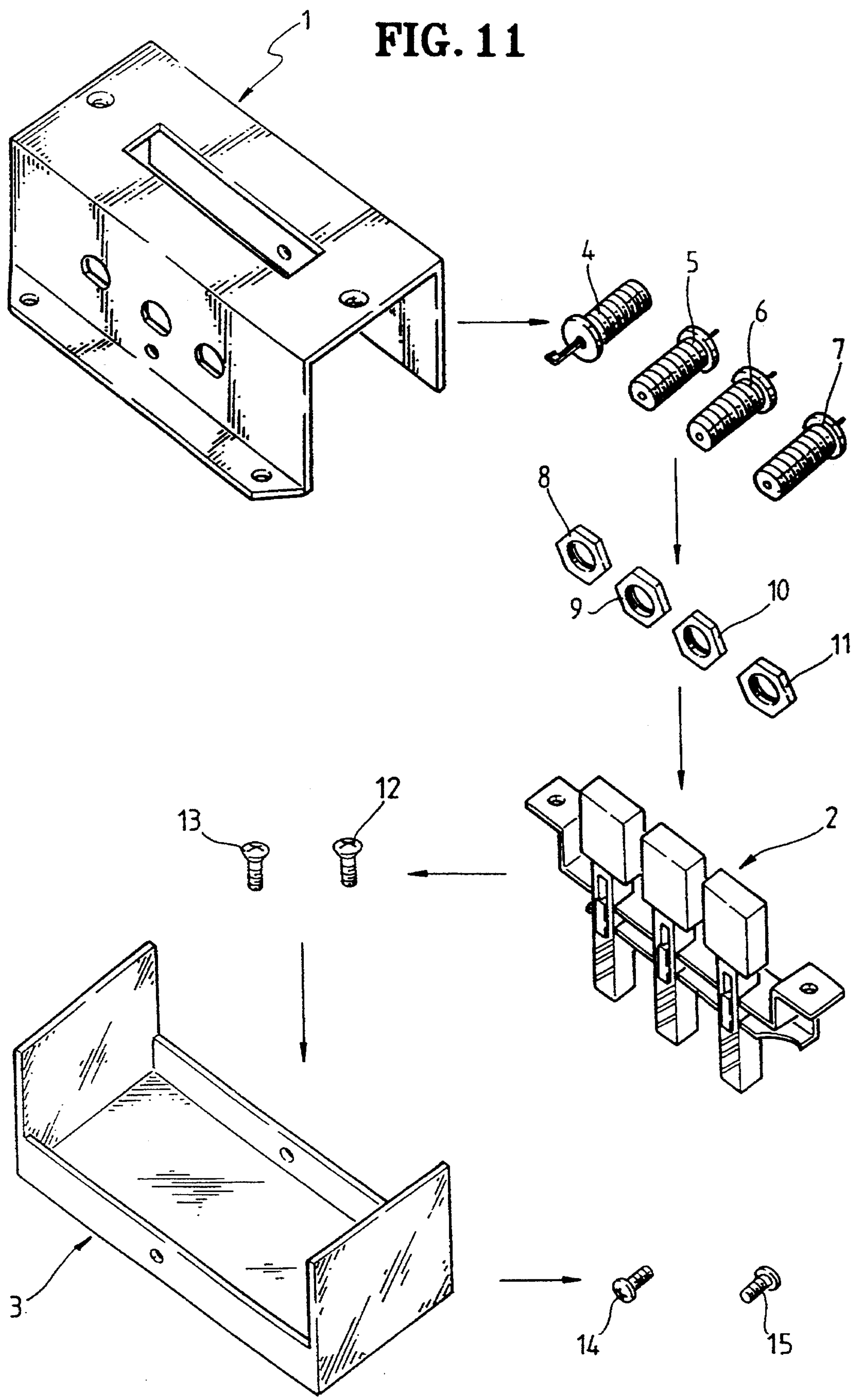
FIG. 11 shows the best assembly sequence of the assembly structure shown in FIG. 10.

FIG. 11 indicates an assembly sequences for the switch shown in FIG. 10, according to the process of sequence number 53 in Table 8.

In FIG. 11, first, connectors 4, 5, 6 and 7 are assembled with upper case 1. Then, nuts 8, 9, 10 and 11 are attached to connectors 4, 5, 6 and 7. Next, button set 2 is fixed to upper case 1 using screws 12 and 13, and then lower case 3 is fitted into upper case 1. Lastly, upper case 1 and lower case 2 are secured using screws 14 and 15.

Therefore, in the evaluation method of the best assembly sequence according to the present invention, all feasible assembly sequences are evaluated and the most efficient assembly sequence based on the ease of assembly can be found. For the enhancement of system efficiency, the system uses the efficient data structure by which all information can be extracted from subassemblies, and employs an efficient method for selecting good assembly sequences. Also, by an assembly using the proposed data structure, called a CRD, all information needed throughout evaluation processes can be represented easily.

Therefore, the best assembly sequence is determined in the process planning step before the manufacturing starts, thereby reducing considerably the factors which incur higher manufacturing costs.

Conventionally, the determination of the best assembly sequence was made by the user's subjective judgement. However, according to the present invention, better assembly sequences can be selected by evaluating and determining assembly sequences on the basis of objective standards and strict logic in view of new technology.

What is claimed is:

1. An evaluation method of assembly sequences comprising steps of:

designing an assembly composed of a plurality of parts;

preparing a component relation diagram (CRD) indicating a joint relation between said plurality of parts;

reducing assembly sequences containing infeasible subassemblies by computing weights of all subassemblies in respective processes of an AND/OR tree structure of said assembly, said step of reducing assembly sequences containing infeasible subassemblies including steps of:

categorizing said subassemblies into infeasible subassemblies if said subassemblies have respective weights greater than upper limit weights which can be handled by respective assembly tools; and deleting assembly sequences containing said infeasible subassemblies;

evaluating feasible assembly sequences obtained from said CRD by the evaluation function $$E(q)=W_h \cdot f(H(q))+W_j \cdot f(J(q))+W_t \cdot f(T(q))$$

where q is an assembly sequence, E(q) is an evaluation function, $W_h$, $W_j$ and $W_t$ are weighting factors for ease of part handling, ease of part joining, and tool changes criteria, respectively, f is a scaling function, H(q) is a sum of weights of all of said subassemblies for said assembly sequence q, J(q) is a number of joining direction changes for said assembly sequence q, and T(q) is a number of tool changes for said assembly sequence q; and performing assembly in said assembly sequence depending on a result of said step of evaluating feasible assembly sequences.

2. An evaluation method of assembly sequences comprising steps of:

designing an assembly composed of a plurality of parts;

preparing a component relation diagram (CRD) indicating a joint relation between said plurality of parts;

reducing assembly sequences containing infeasible subassemblies by computing weights of all subassemblies in respective processes of an AND/OR tree structure of said assembly;

evaluating feasible assembly sequences obtained from said CRD by the evaluation function $$E(q)=W_h \cdot f(H(q))+W_j \cdot f(J(q))+W_t \cdot f(T(q))$$

where q is an assembly sequence, E(q) is an evaluation function, $W_h$, $W_j$ and $W_t$ are weighting factors for ease of part handling, ease of part joining, and tool changes criteria, respectively, f is a scaling function, H(q) is a sum of weights of all of said subassemblies for said assembly sequence q, J(q) is a number of joining direction changes for said assembly sequence q, and T(q) is a number of tool changes for said assembly sequence q; and performing assembly in said assembly sequence depending on a result of said step of evaluating feasible assembly sequences;

wherein H(q) in said evaluation function is obtained by the equation $$H(q) = \sum_{s \in A_q} W_s$$

where $A_q$ is a set of subassemblies in said assembly sequence q and $W_s$ is a weight of a subassembly s.

3. An evaluation method of assembly sequences comprising steps of:

designing an assembly composed of a plurality of parts;

preparing a component relation diagram (CRD) indicating a joint relation between said plurality of parts;

reducing assembly sequences containing infeasible subassemblies by computing weights of all subassemblies in respective processes of an AND/OR tree structure of said assembly;

evaluating feasible assembly sequences obtained from said CRD by the evaluation function $$E(q)=W_h \cdot f(H(q))+W_j \cdot f(J(q))+W_t \cdot f(T(q))$$

where q is an assembly sequence, E(q) is an evaluation function, $W_h$, $W_j$ and $W_t$ are weighting factors for ease of part handling, ease of part joining, and tool changes criteria, respectively, f is a scaling function, H(q) is a sum of weights of all of said subassemblies for said assembly sequence q, J(q) is a number of joining direction changes for said assembly sequence q, and T(q) is a number of tool changes for said assembly sequence q; and performing assembly in said assembly sequence depending on a result of said step of evaluating feasible assembly sequences;

wherein J(q) in said evaluation function is obtained by the steps of:

constructing a set of joining directions $D_s$ by the equation $$D_s = \bigcup_{i \in E_s} JA_i$$

where $E_s$ is a set of edges connected between two components in a CRD, and $JA_i$ is a joining attribute on edge i in a CRD; and computing J(q) by the equation $$J(q) = \sum_{s \in A_q} X_s$$

wherein, if s is a leaf subassembly, $X_s=0$, and if s is not a leaf subassembly, then $X_s=n_s$ 1 for $D_s \cap D_{P(s)} \neq \phi$ and $X_s=n_s$ for $D_s \cap D_{P(s)} \neq \phi$, and where $n_s$ is a number of different directions in $D_s$, P(s) is a set of direct predecessors of said subassembly s, $X_s$ is an indicator variable representing said changes of joining directions for said subassembly s, and $A_q$ is a set of subassemblies in said assembly sequence q.

4. An evaluation method of assembly sequences comprising steps of:

designing an assembly composed of a plurality of parts;

preparing a component relation diagram (CRD) indicating a joint relation between said plurality of parts;

reducing assembly sequences containing infeasible subassemblies by computing weights of all subassemblies in respective processes of an AND/OR tree structure of said assembly;

evaluating feasible assembly sequences obtained from said CRD by the evaluation function $$E(q)=W_h \cdot f(H(q))+W_j \cdot f(J(q))+W_t \cdot f(T(q))$$

where q is an assembly sequence, E(q) is an evaluation function, $W_h$, $W_j$ and $W_t$ are weighting factors for ease of part handling, ease of part joining, and tool changes criteria, respectively, f is a scaling function, H(q) is a sum of weights of all of said subassemblies for said assembly sequence q, J(q) is a number of joining direction changes for said assembly sequence q, and T(q) is a number of tool changes for said assembly sequence q; and performing assembly in said assembly sequence depending on a result of said step of evaluating feasible assembly sequences;

wherein T(q) in said evaluation function is obtained by the steps of:

constructing a set of tools for said subassemblies $T_s$ by the equation $$T_s = \bigcup_{i \in E_s} TA_i$$

where $E_s$ is the set of edges connected between two components in a CRD, and $TA_i$ is the tool attribute on edge i in a CRD; and constructing T(q) by the equation $$T(q) = \sum_{s \in A_q} Y_s$$

wherein, if s is a leaf subassembly, $Y_s=0$, and if s is not a leaf subassembly, $Y_s=n(T_s\ T_{P(s)})$, and where P(s) is a set of direct predecessors of a subassembly s, $Y_s$ is an indicator variable representing changes of tools for said subassembly s, $n(T_s\ T_{P(s)})$ is a number of elements in a set $T_s$ TP(s), and $A_q$ is a set of subassemblies in said assembly sequence q.

5. An evaluation method of assembly sequences comprising steps of:

generating all possible assembly sequences for assembling a plurality of parts of an assembly;

determining parameters for assembling said plurality of parts;

computing evaluation values for respective assembly sequences using said parameters by the following equation, depending on a relation between said plurality of parts, $$E(q)=W_h \cdot f(H(q))+W_j \cdot f(J(q))+W_i \cdot f(T(q))$$

where q is an assembly sequence, E(q) is an evaluation function, $W_h$, $W_j$ and $W_i$ are weighting factors for ease of part handling, ease of part joining, and tool changes criteria, respectively, f is a scaling function, H(q) is a sum of weights of all subassemblies for said assembly sequence q, J(q) is a number of joining direction changes for said assembly sequence q, T(q) is a number of tool changes for said assembly sequence q; and selecting an assembly sequence corresponding to a largest one of said computed evaluation values;

said step of computing evaluation values further comprising a step of deleting ones of said assembly sequences q which are infeasible before computing said evaluation values.

6. An evaluation method of assembly sequences comprising steps of:

generating all possible assembly sequences for assembling a plurality of parts of an assembly;

determining parameters for assembling said plurality of parts;

computing evaluation values for respective assembly sequences using said parameters by the following equation, depending on a relation between said plurality of parts, $$E(q)=W_h \cdot f(H(q))+W_j \cdot f(J(q))+W_i \cdot f(T(q))$$

where q is an assembly sequence, E(q) is an evaluation function, $W_h$, $W_j$ and $W_i$ are weighting factors for ease of part handling, ease of part joining, and tool changes criteria, respectively, f is a scaling function, H(q) is a sum of weights of all subassemblies for said assembly sequence q, J(q) is a number of joining direction changes for said assembly sequence q, T(q) is a number of tool changes for said assembly sequence q; and selecting an assembly sequence corresponding to a largest one of said computed evaluation values;

wherein said step of computing evaluation values for respective assembly sequences includes steps of:

categorizing ones of said subassemblies having respective weights greater than upper limit weights which can be handled by respective assembly tools into infeasible subassemblies; and deleting assembly sequences containing said infeasible subassemblies.

7. An evaluation method of assembly sequences comprising steps of:

generating all possible assembly sequences for assembling a plurality of parts of an assembly;

determining parameters for assembling said plurality of parts;

computing evaluation values for respective assembly sequences using said parameters by the following equation, depending on a relation between said plurality of parts, $$E(q)=W_h \cdot f(H(q))+W_j \cdot f(J(q))+W_i \cdot f(T(q))$$

where q is an assembly sequence, E(q) is an evaluation function, $W_h$, $W_j$ and $W_i$ are weighting factors for ease of part handling, ease of part joining, and tool changes criteria, respectively, f is a scaling function, H(q) is a sum of weights of all subassemblies for said assembly sequence q, J(q) is a number of joining direction changes for said assembly sequence q, T(q) is a number of tool changes for said assembly sequence q; and selecting an assembly sequence corresponding to a largest one of said computed evaluation values;

wherein H(q) in said evaluation function is obtained by the equation $$H(q) = \sum_{s \in A_q} W_s$$

where $A_q$ is a set of subassemblies in said assembly sequence q, and $W_s$ is a weight of a subassembly s.

8. An evaluation method of assembly sequences comprising steps of:

generating all possible assembly sequences for assembling a plurality of parts of an assembly;

determining parameters for assembling said plurality of parts;

computing evaluation values for respective assembly sequences using said parameters by the following equation, depending on a relation between said plurality of parts, $$E(q)=W_h \cdot f(H(q))+W_j \cdot f(J(q))+W_i \cdot f(T(q))$$

where q is an assembly sequence, E(q) is an evaluation function, $W_h$, $W_j$ and $W_i$ are weighting factors for ease of part handling, ease of part joining, and tool changes criteria, respectively, f is a scaling function, H(q) is a sum of weights of all subassemblies for said assembly sequence q, J(q) is a number of joining direction changes for said assembly sequence q, T(q) is a number of tool changes for said assembly sequence q; and selecting an assembly sequence corresponding to a largest one of said computed evaluation values;

wherein J(q) in said evaluation function is obtained by the steps of:

constructing a set of joining directions $D_s$ in accordance with the equation $$D_s = \bigcup_{i \in E_s} JA_i$$

where $E_s$ is a set of edges connected between two components in a CRD, and $JA_i$ is a joining attribute on edge i in a CRD; and computing J(q) by the equation $$J(q) = \sum_{s \in A_q} X_s$$

wherein, if s is a leaf subassembly, $X_s=0$, and if s is not a leaf subassembly, then $X_s=n_s\ 1$ for $D_s \cap D_{P(s)} \neq \phi$ and $X_s=n_s$ for $D_s \cap D_{P(s)}=\phi$, and where $n_s$ is a number of different directions in $D_s$, P(s) is a set of direct predecessors of a subassembly s, $X_s$ is an indicator variable representing changes of joining directions for said subassembly s, and $A_q$ is a set of subassemblies in said assembly sequence q.

9. An evaluation method of assembly sequences comprising steps of:

generating all possible assembly sequences for assembling a plurality of parts of an assembly;

determining parameters for assembling said plurality of parts;

computing evaluation values for respective assembly sequences using said parameters by the following equation, depending on a relation between said plurality of parts, $$E(q)=W_h \cdot f(H(q))+W_j \cdot f(J(q))+W_t \cdot f(T(q))$$

where q is an assembly sequence, E(q) is an evaluation function, $W_h$, $W_j$ and $W_t$ are weighting factors for ease of part handling, ease of part joining, and tool changes criteria, respectively, f is a scaling function, H(q) is a sum of weights of all subassemblies for said assembly sequence q, J(q) is a number of joining direction changes for said assembly sequence q, T(q) is a number of tool changes for said assembly sequence q; and selecting an assembly sequence corresponding to a largest one of said computed evaluation values;

wherein T(q) in said evaluation function is obtained by the steps of:

constructing a set of tools for said subassemblies $T_s$ by the equation $$T_s = \bigcup_{i \in E_s} TA_i$$

where $E_s$ is a set of edges connected between two components in a CRD, and $TA_i$ is a tool attribute on edge i in a CRD; and constructing T(q) by the equation $$T(q) = \sum_{s \in A_q} Y_s$$

wherein, if s is a leaf subassembly, $Y_s=0$, and if s is not a leaf subassembly, $Y_s=n(T_s\ T_{P(s)})$, and where P(s) is a set of direct predecessors of a subassembly s, $Y_s$ is an indicator variable representing changes of tools for said subassembly s, and $n(T_s\ T_{P(s)})$ is a number of elements in a set $T_s\ T_{P(s)}$, and $A_q$ is a set of subassemblies in said assembly sequence q.

10. An evaluation method of assembly sequences comprising steps of:

providing a plurality of parts for forming an assembly;

selecting a plurality of possible assembly sequences of assembling said plurality of parts by deleting from among all possible assembly sequences those assembly sequences which include infeasible subassembly structures;

computing an evaluation value for each of said plurality of possible assembly sequences using the following equation, $$E(q)=W_h \cdot f(H(q))+W_j \cdot f(J(q))+W_t \cdot f(T(q))$$

where q represents each of said plurality of possible assembly sequences, E(q) is an evaluation function for a respective one of said plurality of possible assembly sequences, $W_h$, $W_j$ and $W_t$ are weighting factors for ease of handling said plurality of parts, ease of joining said plurality of parts, and tool changes required for said respective one of said plurality of possible assembly sequences, respectively, f is a scaling function, H(q) is a sum of weights of all subassemblies for said respective one of said plurality of possible assembly sequences, J(q) is a number of joining direction changes for said respective one of said plurality of possible assembly sequences, and T(q) is a number of tool changes for said respective one of said plurality of possible assembly sequences; and assembling said assembly using an assembly sequence having a largest one of said computed evaluation values.

* * * * *